United States Patent
Brunson

(10) Patent No.: US 7,488,146 B2
(45) Date of Patent: Feb. 10, 2009

(54) LARGE HOLESAW MANDREL ASSEMBLY

(75) Inventor: Mark E. Brunson, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 105 days.

(21) Appl. No.: 11/600,540

(22) Filed: Nov. 16, 2006

(65) Prior Publication Data

US 2008/0118315 A1   May 22, 2008

(51) Int. Cl.
*B23B 51/04* (2006.01)
(52) U.S. Cl. .................... 408/204; 408/239 R
(58) Field of Classification Search ............ 408/205, 408/206, 207, 208, 209, 238, 239 R, 703, 408/225, 204; *B23B 51/04, 51/05*
See application file for complete search history.

(56) References Cited

U.S. PATENT DOCUMENTS

| | | | |
|---|---|---|---|
| 2,556,155 A | 6/1951 | Stellin | |
| 2,674,026 A | 4/1954 | St. Palley | |
| 2,826,231 A | 3/1958 | Alden | |
| 3,262,474 A | 7/1966 | Enders | |
| 3,267,975 A | 8/1966 | Enders | |
| 3,424,212 A | 1/1969 | Kemper | |
| 3,456,548 A | 7/1969 | Schmidt et al. | |
| 3,784,316 A | 1/1974 | Bittern | |
| 3,854,840 A | 12/1974 | Miyanaga | |
| 3,970,407 A | 7/1976 | Uffman | |
| 4,148,593 A | 4/1979 | Clark | |
| 4,461,195 A | 7/1984 | Barnick | |
| 4,669,928 A * | 6/1987 | Mediavilla | 408/68 |
| 5,108,235 A | 4/1992 | Czyzewski | |
| 5,154,552 A | 10/1992 | Koetsch | |
| 5,226,762 A | 7/1993 | Ecker | |
| 5,246,317 A | 9/1993 | Koetsch et al. | |
| 5,352,071 A | 10/1994 | Cochran et al. | |
| 5,597,274 A | 1/1997 | Behner | |
| 5,658,102 A | 8/1997 | Gale | |
| 5,690,452 A | 11/1997 | Baublits | |
| 5,813,802 A * | 9/1998 | Ajimi et al. | 408/68 |
| 5,868,532 A | 2/1999 | Spenser | |
| 5,921,562 A | 7/1999 | Robison | |
| 5,967,709 A | 10/1999 | Thuesen | |
| 6,071,219 A | 6/2000 | Cook | |

(Continued)

FOREIGN PATENT DOCUMENTS

DE    1 992 344    8/1968

(Continued)

*Primary Examiner*—Daniel W Howell
(74) *Attorney, Agent, or Firm*—Harness, Dickey & Pierce, P.L.C.

(57) ABSTRACT

A holesaw mandrel has a mandrel body with at least one bore, a pilot drill bit bore, and a first end coupled with the body. The first end is coupled with a driver. A second end extends from the body and includes a threaded spud. A sliding collar is axially movable on the mandrel body. The sliding collar includes at least one pin extending the bore in the mandrel body. A resilient member is positioned adjacent the threaded member to provide enhanced securement of the holesaw. The sliding collar is magnetized to prevent withdrawal of the pin from the holesaw. A positioning member is in the pilot drill bore to provide a desired orientation of the pilot drill bit.

14 Claims, 3 Drawing Sheets

U.S. PATENT DOCUMENTS

| | | | |
|---|---|---|---|
| 6,120,221 | A | 9/2000 | Alm |
| 6,302,409 | B1 | 10/2001 | Gutsche |
| 6,357,973 | B2 | 3/2002 | Chao |
| 6,682,283 | B2 | 1/2004 | Mann et al. |
| 6,705,807 | B1 * | 3/2004 | Rudolph et al. ............ 408/1 R |
| 6,881,017 | B1 * | 4/2005 | Krecek et al. .............. 408/204 |
| 6,939,092 | B2 | 9/2005 | Korb et al. |
| 7,073,992 | B2 | 7/2006 | Korb et al. |
| 2001/0001276 | A1 | 5/2001 | Chao |
| 2005/0025591 | A1 | 2/2005 | Korb et al. |

FOREIGN PATENT DOCUMENTS

| | | |
|---|---|---|
| DE | 74 30 652 | 12/1974 |
| DE | 2624370 | 4/1980 |
| DE | 295 09 238 | 9/1995 |
| DE | 299 17 867 | 4/2000 |
| EP | 0 235 581 | 10/1989 |
| EP | 0 732 164 | 8/1999 |
| EP | 0 811 449 | 7/2001 |
| EP | 0 776 721 | 11/2002 |
| EP | 1 193 014 | 7/2004 |
| EP | 1 447 195 | 8/2005 |
| GB | 2257381 | 1/1993 |
| GB | 2295110 | 5/1996 |
| WO | WO 97/49516 | 12/1997 |
| WO | WO 98/26890 | 6/1998 |
| WO | WO 01/38028 | 5/2001 |
| WO | WO 2004/085104 | 10/2004 |
| WO | WO 2005/000506 | 1/2005 |
| WO | WO 2005/120754 | 12/2005 |

* cited by examiner

LARGE HOLESAW MANDREL ASSEMBLY

FIELD

The present disclosure relates to holesaws and, more particularly, to a mandrel assembly which enables easy removal of a holesaw.

BACKGROUND

Holesaw mandrel assemblies exist in the art. Ordinarily, the holesaw mandrel assembly includes a threaded spud to receive a holesaw. The mandrel assembly also includes pins which fit into apertures in the holesaw base to maintain the holesaw in position during use. When the holesaw is in a use position, ordinarily the holesaw is loose on or has play between the pins enabling slight movement of the holesaws. This is due to the fact that the apertures in the base of the holesaw do not align with the pins when the holesaw is tightened onto the mandrel. Thus, the holesaw must be backed off from contacting the mandrel in order for the pins to fit into the apertures in the base of the holesaw. Thus, there is vibration and noise associated with the holesaw during use.

Also, during use, since there is play between the holesaw and the pins, it is possible that the pins may withdraw from the holesaw. Also, since the pins, which are attached to a spring loaded sliding collar, must be removed from the holesaw through the mandrel body in order to remove the holesaw, a large spring force cannot be utilized. This is due to the fact that the sliding collar must be moved by the user. Thus, the spring force must enable easy movement of the sliding collar which may not be optimun to retain the pins in the holesaw.

Also, holesaws generally include a bore to receive a pilot drill bit. The bore ordinarily includes a set screw perpendicular to the axis of the bore to retain the pilot drill in the bore. The bores are right cylindrical bores and provide the same retention mechanism for various types of shanks on the pilot drill bits.

Thus, it would be desirable to eliminate play between the holesaw and the mandrel. Likewise, it is desirable to increase the retention of the pins in the holesaw apertures. Further, it is desirable to provide a pilot drill bit bore which accommodates pilot drill bits various types of shanking ends.

SUMMARY

The present disclosure overcomes the deficiencies of the prior art. The present disclosure provides a resilient member which compresses when contact by the holesaw to eliminate play between the holesaw and the mandrel body when the holesaw is in a used position. The present disclosure provides a magnetized sliding collar which is magnetically attracted to the mandrel body to enhance the connection between the sliding collar and the mandrel body to prevent withdrawal of the pins from apertures in the holesaw. The present disclosure provides a positioning member in the pilot drill bore to provide a desired orientation of the pilot drill bit.

According to a first aspect of the disclosure, a holesaw mandrel assembly comprises a mandrel including a body having at least one bore. A first end couples the body with a driver, such as a drill motor. A second end extends from the body and includes a threaded spud. A sliding collar is axially movable on the body. The sliding collar includes at least one pin extending through the mandrel body at least one bore into a holesaw. A resilient member is adjacent the threaded spud. The resilient member compresses when it is contacted by a holesaw screwed onto the threaded member. The resilient member eliminates play between the holesaw and the mandrel body when in a used position. The resilient member may be an O-ring surrounding the threaded spud. The O-ring abuts and rests upon the mandrel body.

According to a second aspect of the disclosure, a holesaw mandrel assembly comprises a mandrel including a body having at least one bore and a first end coupled with the body. The first end is coupled with a driver, such as a drill motor. A second end extends from the body and includes a threaded spud. A sliding collar is axially movable on the body. The sliding collar includes at least one pin extending through the mandrel body at least one bore to couple with a holesaw. The sliding collar is magnetized such that it is magnetically attracted to the mandrel body. This enhances the connection between the sliding collar and the mandrel body to prevent withdrawal of the at least one pin from the holesaw. One or more magnets can be inlayed and coupled with the sliding collar. The one or more magnets may be equally spaced about the sliding collar.

According to a third aspect of the disclosure, a holesaw mandrel assembly comprises a mandrel with a body having at least one bore and a first end coupled with the body. The first end couples the mandrel with a driver such as a drill motor. A second end extends from the body. The second end includes a threaded spud. A sliding collar is axially movable on the body. The collar includes at least one pin extending through the mandrel body at least one bore into a holesaw. A positioning member is in a pilot drill bore in the mandrel body. The positioning member provides a desired orientation of a pilot drill bit on the mandrel assembly. The positioning member includes a flat portion in the bore. The flat bore is positioned behind a set screw which retains the pilot drill bit in the pilot bore.

According to a fourth aspect of the disclosure, a holesaw mandrel assembly comprises a mandrel including a body having at least one bore and a first end coupled to the body. The first end couples the mandrel with a driver such as a drill motor. The second end extends from the body. The second end includes a threaded spud. A sliding collar axially moves on the body. The sliding collar includes at least one pin extending through the mandrel body at least one bore into a holesaw. A resilient member is positioned adjacent the threaded member. The resilient member compresses when contacted by the holesaw screwed onto the threaded spud. The resilient member prevents vibration and play. The sliding collar is magnetized such that the sliding collar is magnetically attracted to the body to enhance the connection between the sliding collar and the mandrel body to prevent withdrawal of the at least one pin from the holesaw. Also, a positioning member is in a pilot drill bore to provide a desired orientation of the pilot drill bit. A set screw with a head for receiving multiple tools retains the pilot drill bit in the mandrel.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
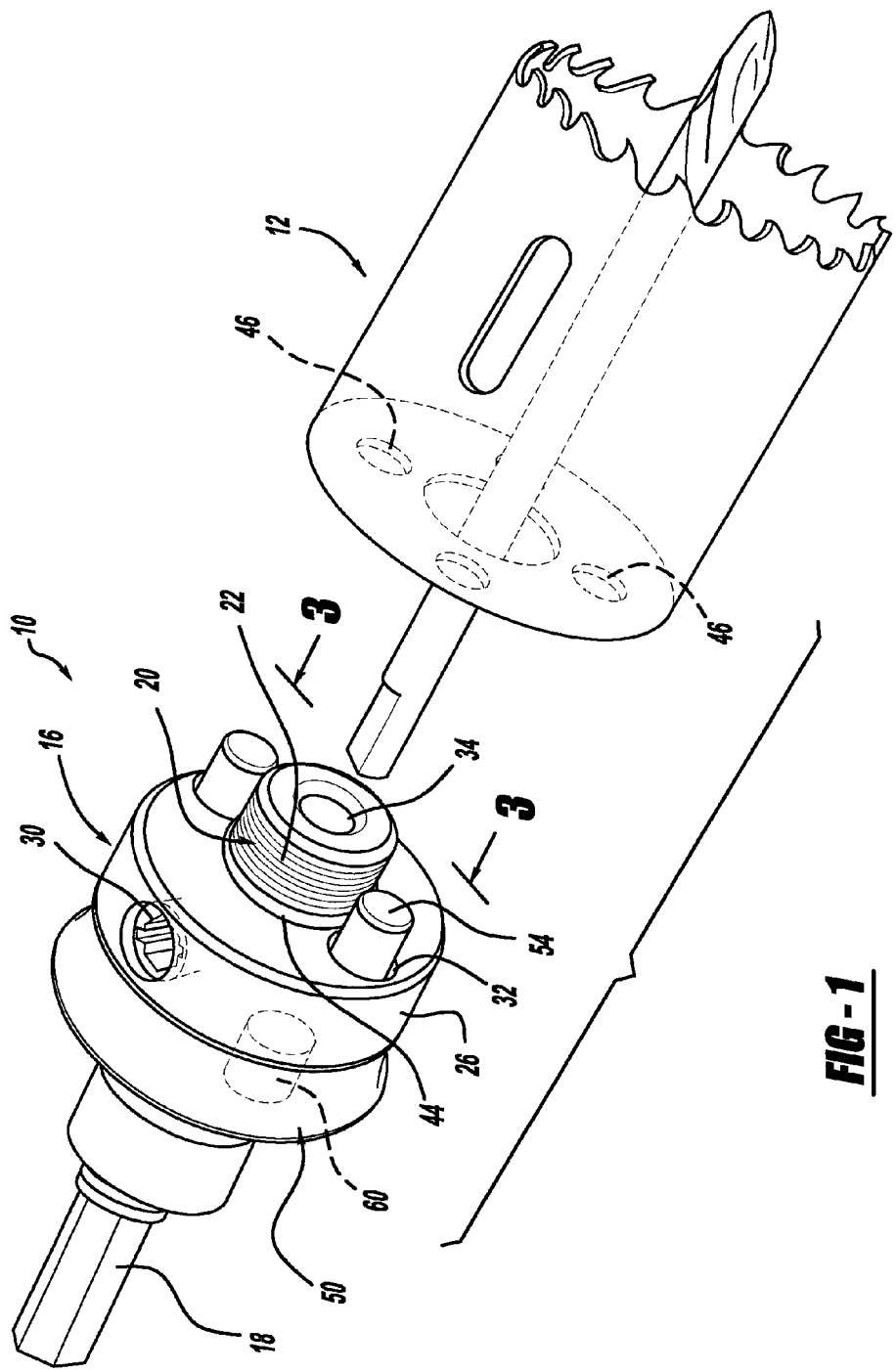
FIG. 1 is a perspective view of a holesaw mandrel assembly.
Figure 2:
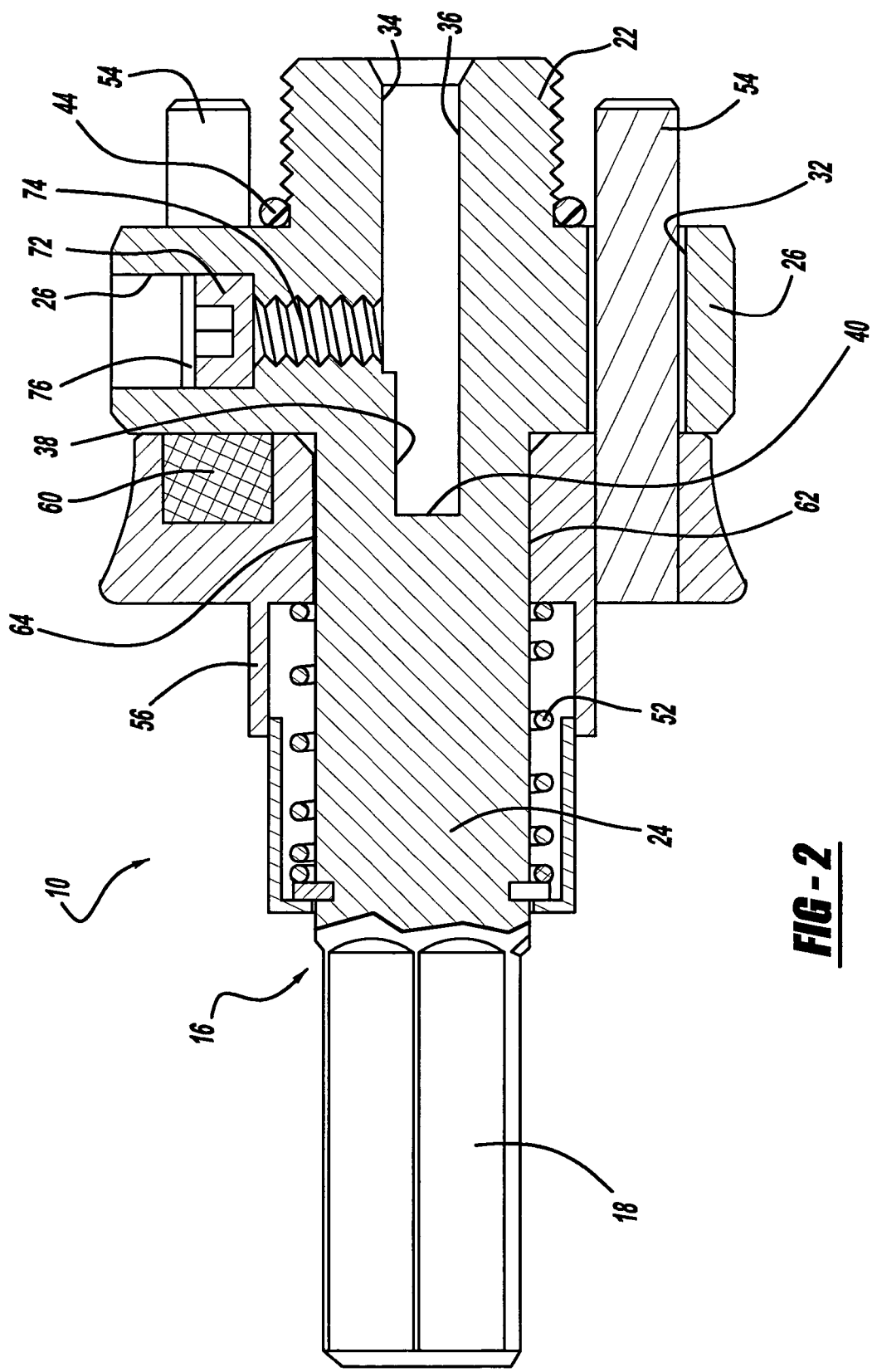
FIG. 2 is a cross-section view of FIG. 1 along line 2-2 thereof.
Figure 3:
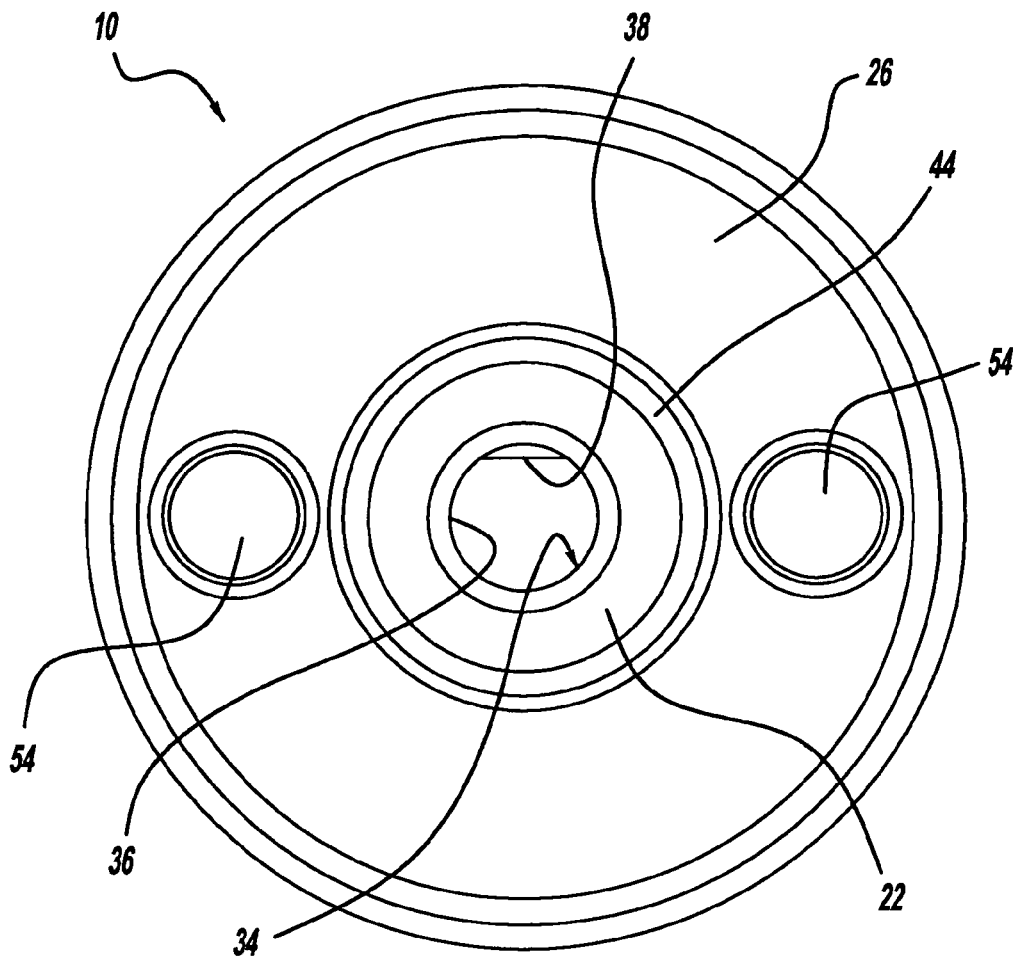
FIG. 3 is a front plan view of the holesaw mandrel of FIG. 1 with the pilot drill bit removed.

The following description is merely exemplary in nature and is not intended to limit the present disclosure, application, or uses.

Turning to the drawings, a holesaw mandrel assembly is illustrated and designated with the reference numeral 10. A holesaw 12 is illustrated in perspective. Also, a pilot drill bit extends from the mandrel assembly 10.

The mandrel assembly 10 includes a mandrel body 16. The mandrel body 16 includes a first end 18 and a second end 20. The first end 18 may have an outer polygonal shape to fit into a driver such as a drill motor. The second end 20 includes a threaded spud 22. The threaded spud 22 receives the holesaw 12 in a conventional manner.

The mandrel body 16 has an enlarged cylindrical portion 24 adjacent the first end 18. The enlarged cylindrical portion 24 terminates at a cylindrical collar 26. The cylindrical collar 26 includes a set screw bore 28 which receives set screw 30. Also, bores 32 extend through the cylindrical collar 26. The bores 32 receive retaining pins which will be explained herein. Also, a pilot drill bit bore 34 extends through the second end 20 into the cylindrical collar 26 and enlarged cylindrical portion 24.

The cylindrical bore 34 defines a cylindrical surface 36 having a flat portion 38 adjacent the terminus 40 of the bore. The flat portion 38 includes a planar surface which is parallel to the axis of the bore. The flat portion 38 provides a surface to position of pilot drill bits into the bore 34. A pilot drill bit having a single flat shanking portion or a tri-lobe shanking portion will contact the flat portion 38. This provides proper orientation of the pilot drill bits in the bore 34. This also positions the pilot drill bit at a desired position with respect to the set screw, which secures the drill bit in the bore 34. In the case of a cylindrical pilot drill bit, the terminal end of the drill bit contacts the flat portion 38 to position it with respect to the set screw.

A resilient member 44 is positioned on the second end 20 of the mandrel body 16. The resilient member 44 can be a rubber O-ring surrounding the threaded spud 22. The resilient member 44 provides the holesaw mandrel assembly 10 with a compression member. When the holesaw 12 is screwed onto the spud 22, the holesaw 12 is turned until it contacts the resilient member 44. Since the resilient member 44 abuts the face of the cylindrical collar 26, it compresses when contacted by the holesaw 12. The holesaw 12 is continued to be turned until the pins 54 can extend into the aperture 46 in the base of the holesaw 12. Thus, the holesaw 12 is maintained in position, during use, against vibration and play which occurs in prior art devices.

A sliding collar 50 is positioned onto the enlarged cylindrical portion 24 of the body 16. The sliding collar 50 axially moves along the enlarged cylindrical portion 24. A spring 52 provides a force to push the sliding collar 50 against the body collar 26. The collar 50 includes at least one, and preferably a pair of pins 54. The pins 54 project through bores 32 in the cylindrical collar 26. The pins 54, in turn, project into the apertures 46 in the base of the holesaw 12 to retain the holesaw in position on the threaded spud 22. The sliding collar 50 includes a skirt 56 which retains the spring in contact with the sliding collar 50.

The sliding collar 50 may be magnetized. Thus, the sliding collar 50 is magnetically attracted to the cylindrical collar 26 of the mandrel body 16. The sliding collar 50 may include one or more magnets 60 positioned flush with the surface of the sliding collar adjacent the body cylindrical collar 26. When a plurality of magnets 60 is used, they are equally spaced about the sliding collar 50. The magnet 60 further enhances the retention of the pins 54 in position extending through the cylindrical collar 26 and holesaw 12. This prevents withdrawal of the pins 54 from the holesaw 12.

The sliding collar 50 includes a bore 62 which is in contact with the enlarged cylindrical portion 24. The bore 62 has a contact surface 64 which provides increased surface contact with the enlarged cylindrical portion 24. The increased surface contact reduces vibration and wobbling of the sliding collar 50 on the enlarged cylindrical portion 24. This in turn provides a smooth sliding motion of the sliding collar 50 on the enlarged cylindrical portion 24.

The set screw 30 includes a head 72 and a shank 74. The head 72 includes a tool receiving receptacle 76, which receives multiple tools. As illustrated, the tool receiving receptacle 76 is set to receive a hex wrench or a flat screwdriver. Thus, the set screw 30 can be removed by one or more different tools.

The description of the invention is merely exemplary in nature and, thus, variations that do not depart from the gist of the invention are intended to be within the scope of the invention. Such variations are not to be regarded as a departure from the spirit and scope of the disclosure.

What is claimed is:

1. A holesaw mandrel assembly comprising:
   a mandrel including a body having at least one bore and a first end coupled with said body, said first end for coupling with driver, a second end extending from said body, said second end including a threaded member;
   a sliding collar axially movable on said body, said collar including at least one pin extending through said mandrel body at least one bore; and
   a resilient member adjacent said threaded member, said resilient member compressing when contacted by a holesaw screwed onto said threaded member, said resilient member reducing vibration and play of the holesaw on the mandrel.

2. The holesaw mandrel assembly of claim 1, wherein said resilient member being an O-ring surrounding said threaded member.

3. The holesaw mandrel assembly of claim 2, wherein said O-ring abuts said mandrel body.

4. A holesaw mandrel assembly comprising:
   a mandrel including a body having at least one bore and a first end coupled with said body, said first end for coupling with a driver, a second end extending from said body, said second end including a threaded member;
   a sliding collar axially movable on said body, said collar including at least one pin extending through said at least one bore;
   said sliding collar being magnetized such that said sliding collar is magnetically attracted to said body enhancing the connection between the sliding collar and said body for preventing withdrawal of said at least one pin from a hole saw.

5. The holesaw mandrel assembly of claim 4, wherein one or more magnets are coupled with said sliding collar.

6. The holesaw mandrel assembly of claim 5, wherein said one or more magnets are equally spaced about said sliding collar.

7. A holesaw mandrel assembly comprising:
   a mandrel including a body having at least one bore, a pilot drill bore and a first end coupled with said body, said first end for coupling with a driver, a second end extending from said body, said second end including a threaded member;

a sliding collar axially movable on said body, said collar including at least one pin extending through said at least one bore;

a resilient member adjacent said threaded member, said resilient member compressing when contacted by a holesaw screwed onto said threaded member, said resilient member reducing vibration and/or play of the holesaw on the mandrel;

said sliding collar being magnetized such that said sliding collar is magnetically attracted to said mandrel body enhancing the connection between the sliding collar and said body for preventing withdrawal of said at least one pin from a hole saw; and a positioning member in said pilot drill bore for providing a desired orientation of a pilot drill bit.

8. The holesaw mandrel body assembly according to claim 7 wherein a set screw having a head for receiving multiple tools retains said pilot drill bit in said mandrel body.

9. The holesaw mandrel assembly of claim 7, wherein said resilient member being an O-ring surrounding said threaded member.

10. The holesaw mandrel assembly of claim 8, wherein said O-ring abuts said mandrel body.

11. The holesaw mandrel assembly of claim 8, wherein one or more magnets are coupled with said sliding collar.

12. The holesaw mandrel assembly of claim 11, wherein said one or more magnets are equally spaced about said sliding collar.

13. The holesaw mandrel assembly of claim 8, wherein said positioning member includes a flat in said bore.

14. The holesaw mandrel assembly of claim 13, wherein said flat is positioned behind a set screw in said bore.

* * * * *